United States Patent
Oishi et al.

[15] 3,658,436
[45] Apr. 25, 1972

[54] WATER TURBINE OPERATION METHOD AND SYSTEM

[72] Inventors: Asao Oishi; Takao Doi; Yoshimasa Ueno, all of Hitachi, Japan

[73] Assignee: Hitachi, Ltd., Tokyo, Japan

[22] Filed: Mar. 6, 1970

[21] Appl. No.: 17,206

[30] Foreign Application Priority Data

Mar. 10, 1969 Japan..................................44/18455

[52] U.S. Cl..................................................415/1, 415/13
[51] Int. Cl...............................................................F01d 17/00
[58] Field of Search...................................................415/1, 13

[56] References Cited

UNITED STATES PATENTS

| | | |
|---|---|---|
| 1,474,086 | 11/1923 | Poebing.....................................415/1 |
| 3,030,070 | 4/1962 | Krauss........................................415/1 |
| 3,264,485 | 8/1966 | Naganuma et al.........................415/1 |
| 3,309,057 | 3/1967 | Tonooka....................................415/1 |
| 3,372,645 | 3/1968 | Willi..........................................415/1 |
| 3,533,709 | 10/1970 | Willi..........................................415/1 |

Primary Examiner—C. J. Husar
Attorney—Craig, Antonelli & Hill

[57] ABSTRACT

When a water turbine is shifted from phase modifier operation to electric power generator operation, a guide vane is opened to a predetermined limited extent after a by-pass valve is wide opened and thereafter a main valve is opened while the guide vane is opened following the opening of the main valve by detecting the hydraulic pressure within a casing.

2 Claims, 4 Drawing Figures

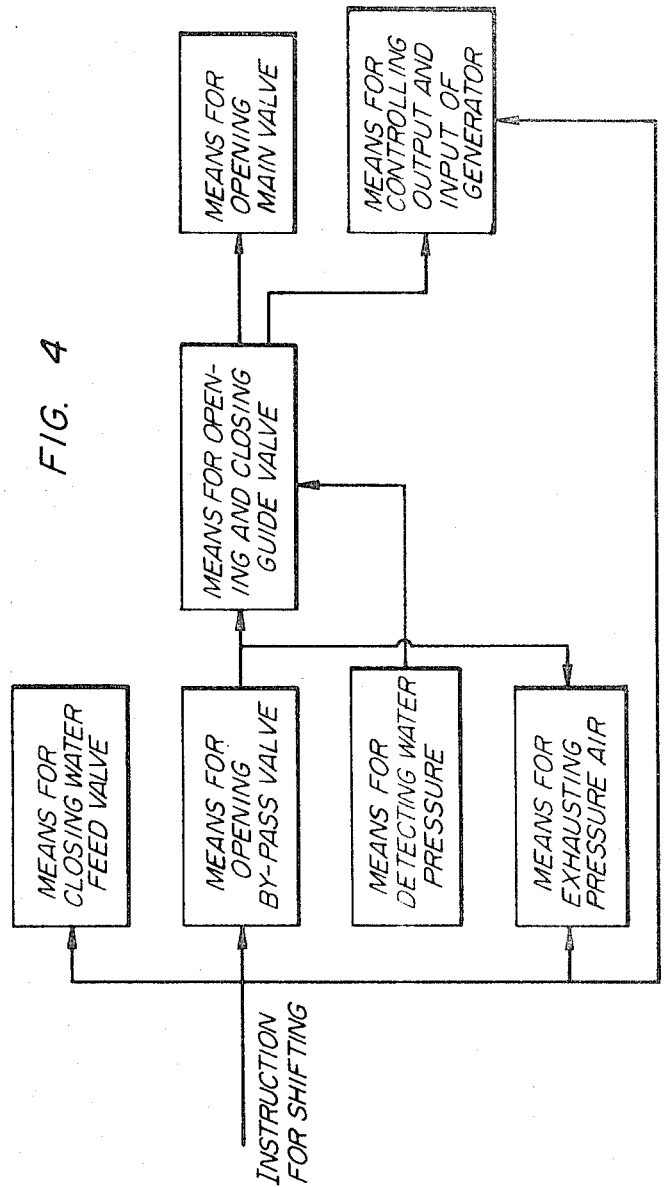

WATER TURBINE OPERATION METHOD AND SYSTEM

The present invention relates to a method and system for shifting from phase modifier operation to electric power generator operation of water turbine in a hydroelectric plant having a few to several generators.

Generally water turbine generators are not used only for generating electric power. When the power consumption is relatively less, the water turbine generators are driven as rotary phase modifiers instead of being shut down so as to improve the power factor of the power transmission system. These water turbine generators must be immediately shifted from phase modifier operation to electric power generator operation when the load of the running generators is suddenly increased.

When the water turbine generators are driven as phase modifiers in parallel with the transmission system, the resistance of the water turbine runner may be reduced by placing it in the compressed air in order to minimize the input as much as possible to the water turbine generators which are driven as phase modifiers. More particularly, the water in the runner casing is forced down into the draft tube by forcing the air under pressure into the casing so that the runner may be placed in the compressed air, thereby decreasing the runner rotation resistance and reducing the input to the phase modifiers.

When the water turbine generators are shifted from phase modifier operation to electric power generating operation, the air in the runner chamber for lowering the water level therein must be discharged from the draft tube. For this purpose, the prior art opens an exhaust valve associated with the water turbine casing so as to completely discharge the air from the draft tube and thereafter open gradually the guide vane after the by-pass valve and the main valve have been fully opened thereby shifting the water turbine generators to the power generating operation. Therefore, there is a long time interval between the step for discharging the air and the step of starting the power generation so that the water turbine generators cannot be shifted immediately to the power generating operation in response to the sudden load increase.

The longer discharge time required for discharging the compressed air and the longer time interval during which the water turbine runner is under water mean that the resistance to the rotation of the water turbine runner is high and lasts for a considerably long time. Therefore, the power loss of the motor for rotating the water turbine runner is increased and the power of the transmission system is abnormally reduced.

In view of the above, the present invention has its object to provide a water turbine control method capable of shifting water turbines to electric power generating operation in a very effective manner thereby reducing the shifting time and the power loss.

In brief, according to the present invention, when the water turbine which gas been driving as a phase modifier is shifted to the electric power generating operation, a by-pass valve is first opened and at the same time an exhaust valve for discharging the compressed air for lowering the water level in a casing is opened. After the by-pass valve has been fully opened, the exhaust valve is closed while a guide vane is opened to a limited smaller degree. Thereafter a main valve is started to open and the guide vane is completely opened before the main valve is completely opened. The degree of opening of the guide vane relative to the degree of opening of the guide vane relative to the degree of opening of the main valve is controlled in response to the hydraulic pressure within the casing.

FIG. 4 is a block diagram for explaining the system of the present invention.

Figure 1:
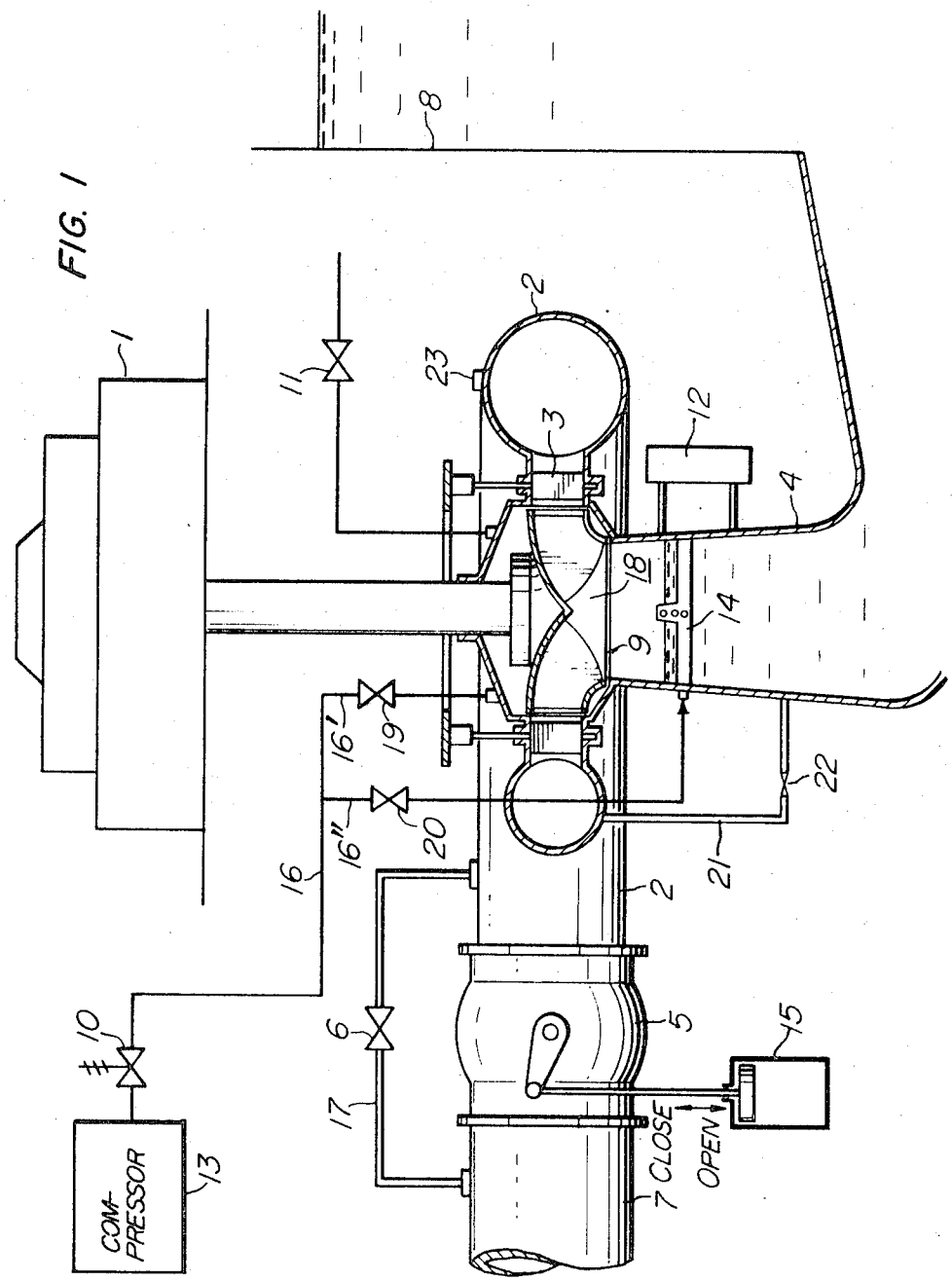
FIG. 1 is a schematic partial sectional view of a water turbine embodying the present invention; the water turbine being illustrated as being driven as a phase modifier.

A water turbine generator 1 may be used as a motor for rotating the water turbine, when required. Reference numeral 2 designates a water turbine casing; 3, guide vanes; 4, a draft tube; and 5, a main valve disposed in a connection between a steel penstock 7 and the casing 2. The penstock 7 and the casing 2 are intercommunicated with each other by a by-pass 17. Reference numeral 6 designates a by-pass valve of the by-pass 17; 8, a tail water reservoir; 9, a water turbine runner; 10, a valve interposed in an air pipe 16 for forcing the compressed air from an air compressor 13 into a water turbine runner chamber 18; 11, an exhaust valve for discharging the compressed air from the runner chamber 18; 12, a water level detecting device for detecting the water level in the runner chamber 18 which is forced down under the force of the compressed air; and 14, a suction pipe for supplying the air into the draft tube 4 where the negative pressure is produced in operation. The air supply pipe 16 is branched into pipes 16' and 16'' for supplying the air into the runner chamber 18 and the suction pipe 14 respectively from the air compressor 13 by suitably operating the valves 19 and 20 of the pipes 16' and 16''. A servomotor 15 is provided for opening and closing the main valve 5. Draft tube 4 is communicated with casing 2 through a piping 21 having a feed valve 22. Water pressure detecting instrument 23 is fixed to the casing 2 for detecting the pressure within the casing 2 through a hole 36 (See FIG. 3).

Figure 3:
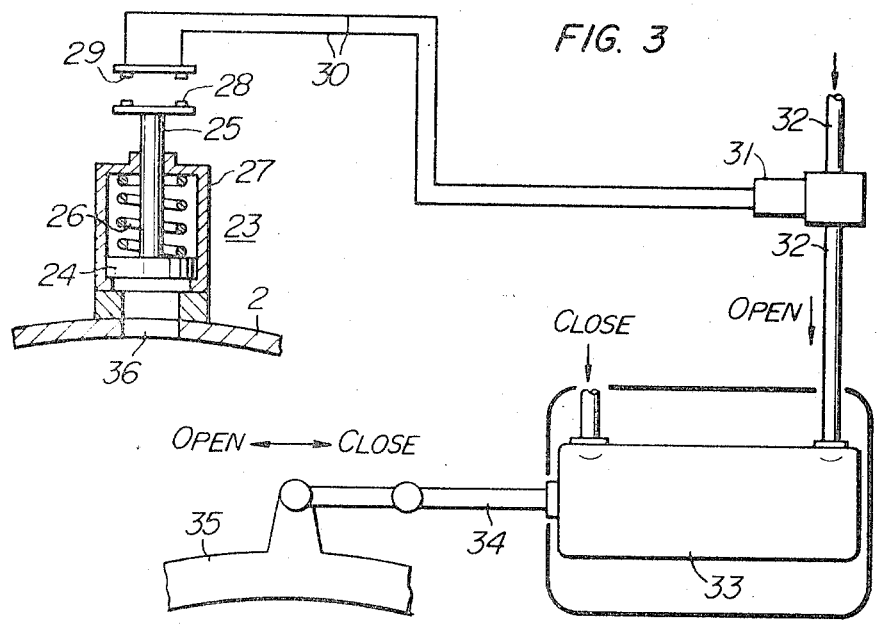
FIG. 3 is a schematic view for explaining the controlling system in accordance with the present invention.

Referring to FIG. 3, the water pressure detecting instrument 23 comprises a cylinder 27, a piston 24 for slidable movement in the cylinder 27, a spring 26 for normally biasing the piston 24 downwardly with a suitable force withstanding the water pressure within the casing 2 and a piston rod 25 adapted to move in unison with the piston 24 and having a contact 28 fixed to the free end thereof. A contact 29 is disposed so as to oppose the contact 28 so that the contact 28 may contact with the contact 29 depending upon the movement of the piston 24 in response to the water pressure within the casing 2. The contact 29 is electrically coupled through lead wires 30 to a servomotor 31 for opening or closing the guide vane 3. An electromagnet valve 23 is disposed in a pipe 32 for feeding the oil under pressure for opening the guide vane 3. The free end of a piston rod 34 of the servomotor 33 is drivingly coupled to a guide ring 35 which in turn is connected to a lever (not shown) for operating the guide vane 3.

Referring back to FIG. 1, when the water turbine generator 1 is operating as a motor for phase modification, all of the main valve 5, the guide vane 3, the valve 10 and the exhaust valve 11 are closed while the feed valve 22 is opened so that the tail water in the reservoir 8 is forced into the casing 2, thereby maintaining the water pressure in the casing 2 at a suitable level and also feeding the water in the amount equivalent to the amount of the leakage of water from the guide vane 3. In the runner chamber 18, a desired water level is maintained by introducing therein the compressed air from the air compressor 13 and by the water level measuring instrument 12, so that the runner 9 is rotating in the compressed air. The water leaking from the guide vane 3 is used for cooling this rotating runner 9. It is noted that the valves 19 and 20 are not necessarily closed.

Figure 2:
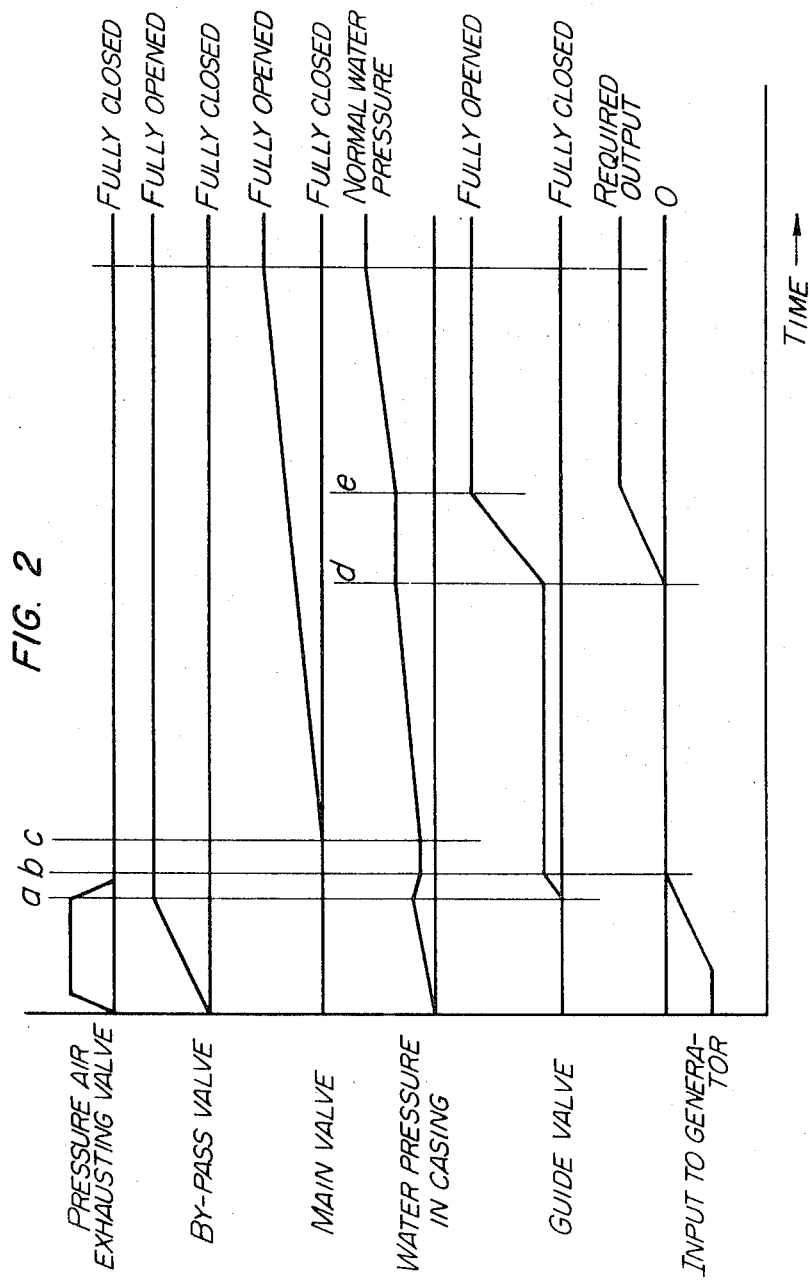
FIG. 2 is a timing diagram for explanation of actuation of various parts thereof.

When the water turbine generator is shifted from its phase modifier operation to power generation, the feed valve 22 is closed in response to the shift instruction and the by-pass valve 6 starts to open. The exhaust valve 11 for exhausting the compressed air within the water turbine chamber 18 is opened and the input of the phase modifier is interrupted. When the by-pass valve 6 is fully opened at the time indicated by the line *a* in FIG. 2, the exhaust valve 11 is closed while the guide vane 3 is opened to a predetermined degree. In this case, water pressure of the steel penstock becomes substantially equal to that in the casing 2 because the by-pass valve 6 is fully opened. There is no sudden increase in water pressure in the casing 2 so that the casing 2 may be well protected. Since the water is supplied as leaking water from the guide vane 3, the closure of the feed valve 22 may be compensated. It is important that the opening area of the guide vane 3 at its limited opening position is smaller than the opening area of the by-pass valve 6 at its fully opened position because when said area of the guide vane 3 is larger than said area of the by-pass valve 6, the water pressure within the casing 2 becomes exceedingly lower than that in the steel penstock 7 and finally becomes the negative pressure so that the compressed air within the water turbine chamber 18 is sucked into the casing 2, thereby causing the vibrations and noises when the generator is shifted to the power generation. In view of the above, special care must be taken so as to suitably regulate the water pressure within the casing 2. Therefore, the opening area of the guide vane 3 at its limited opening position must be smaller than the opening area of the by-pass valve 6 at its fully opened position and it is preferable that the opening area of the guide vane 3 at its limited position be increased as much as possible within the opening area of the by-pass valve 6 at its fully opened position since it serves to drive the runner toward the water turbine. Upon opening the guide vane 3 to its limited opening position described hereinabove, the water pressure within the casing 2 may be maintained at a suitable level while the water under pressure is flowing into the runner chamber 18 so as to facilitate the rotation of the runner 9 in the direction of the water turbine power generation. As described hereinbefore, the compressed air within the water turbine chamber 18 has been completely exhausted until the by-pass valve 6 is fully opened so that the runner chamber 18 is filled with water, but not to the full extent. Therefore upon rotation of the runner 9 in the direction of the water turbine, the phase modifier would consume a large amount of power because of the resistance from the water, but the input to the phase modifier is interrupted and the guide vane 3 is partially opened even when the input interruption is somewhat delayed as shown in FIG. 2, so that the power consumption may be reduced, thereby preventing the excess decrease in power in the transmission system. The runner has a force for continuing its rotation by its own inertia so that its r.p.m. will not be exceedingly reduced. The small amount of the compressed air remained in the water turbine chamber 18 is mixed with the water and turned into air bubbles and discharged through the draft tube 4 into the tail water reservoir 8 so that the operation is not adversely affected. At the time indicated by the line b in FIG. 2 when the guide vane 3 is opened to its above described limited opening position, the input to the phase modifier is shut off and the runner 9 can rotate only by the water from the guide vane 3 at its above described limited opening position.

At the time indicated by the line b in FIG. 2, the conditions for opening the main valve 5 are fulfilled. But when the main valve 5 is immediately opened after the guide vane 3 is opened to said limited opening position, the vibrations will be caused because the water pressure within the casing 2 has not been stabilized sufficiently. It is therefore necessary that the main valve 5 is opened after the water pressure within the casing 2 has been sufficiently stabilized. This can be accomplished by use of a time limit relay or the like.

The water pressure within the casing 2 is increased after the by-pass valve 6 has started to open as shown in FIG. 2, but it is once decreased when the guide vane 3 is started to open to its limited opening position. Thereafter the water pressure is increased again upon opening of the main valve 5. The main valve 5 is opened at a constant speed so that the water pressure within the casing 2 is increased accordingly. When the pressure within the casing 2 reaches a predetermined level, the water pressure detecting instrument 23 fixed to the casing 2 is actuated so that the guide vane 3 which has been in said limited opening position starts to open further. More specifically when, the water pressure detected through the hole 36 formed through the casing 2 reaches a predetermined level, the piston 24 is caused to move upwardly against the spring 26 so that the contacts 28 of the piston rod 25 contact with the contacts 29, thereby energizing the electromagnet valve 31 so as to open it. Consequently, the oil under pressure is forced through the pip 32 so that the servomotor 33 is actuated so as to open the guide vane 3. That is, the actuation of the servomotor 33 causes the guide ring 35 to open the guide vane 3.

Upon starting of the opening of the guide vane 3, the water pressure within the casing is reduced, but it is dangerous that the water pressure within the casing 2 is reduced because of the above described reasons. Therefore, upon reduction in the water pressure within the casing 2, the piston 24 of the water pressure detecting instrument 23 moved downwardly under the force of the spring 26 so that the contacts 28 and 29 are opened. Therefore the electromagnet valve 31 is deenergized so as to close so that the servomotor 33 is deactivated, thereby stopping the guide vane opening operation. But the main valve 5 continues to open so that the hydraulic pressure within the casing 2 is restored. When the water pressure rises in excess of said predetermined level, the water pressure detecting instrument 23 is actuated again. Thus, the above described water pressure adjustment operations are cycled so as to protect the casing 2 until the guide vane 3 is fully opened at the time indicated by the line e in FIG. 2.

At the time α when the guide vane 3 at its said limited opening position starts to open further, the incoming generator is operated in parallel with the transmission system. At this time, the flow of water into the runner chamber 18 form the guide vane 3 is sufficient enough to rotate the runner so that when the generator is operated in parallel with the transmission system, the latter is not adversely affected.

From the above, it will be understood that in response to the instruction os shifting the generator to the generation from the phase modification, the generator may be set in its ac generation until the by-pass valve 6 and the main valve 5 are opened, so that the time required for shifting is much reduced. The r.p.m. of the runner 9 is not exceedingly reduced during the shift. The power consumption of the phase modifier is reduced and the system exhibits no abnormal decrease in power.

The present invention has been so far described with particular reference to one illustrative embodiment thereof, but it will be understood that variations and modifications can be effected without departing from the true spirit of the present invention as described hereinabove and as defined in the appended claims.

What is claimed is:

1. A water turbine control method comprising the steps of closing a feed valve for supplying water so as to compensate
   the leakage of water from a guide vane in response to the instruction for shifting to ac generation a water turbine which is running for phase modification,
   opening a by-pass valve to full extent,
   opening an exhaust valve for exhausting the compressed air from a runner chamber,
   shutting off the input to the phase modifier,
   closing said exhaust valve when said by-pass valve is fully opened,
   opening said guide vane to the maximum extent within the opening area of said by-pass valve when it is fully opened,
   starting to open a main valve after said guide vane has been opened to a predetermined degree,
   detecting the water pressure increase within a casing due to the opening process of said main valve so that when said water pressure reaches a predetermined level, said guide vane is started to open to the full extent from said partial opening,
   detecting the variation in water pressure within said casing due to the continuation of said opening process of said main valve so as to have said guide vane opening operation follow said guide vane to its full opening degree before said main valve is fully opened, and
   connecting a generator in parallel with a transmission system when said guide vane has started to further open to its full opening degree from said opening of said predetermined degree.

2. A water turbine operation system for a plurality of water turbines each comprising means for detecting the water pressure within a water turbine casing, a main valve for opening and closing a penstock connected to the inlet of said casing, a by-pass for communicating said casing with said penstock by by-passing said main valve, a by-pass valve of said by-pass and a guide vane at the inlet of a water turbine runner, said plurality of water turbines being drivingly coupled to respective generators which serve also as phase modifiers, said operation system comprising:
  means for driving
    means for closing in response to an instruction for shifting said water turbine in phase modifier operation to the electric power generating operation, a water feed valve which supplies water for compensating the water leaking from said guide vane,
    means for opening said by-pass valve to the full opening,
    means for opening an exhaust valve for exhausting from a runner chamber the compressed air, and
    means for interrupting the input to phase modifiers;
  means for actuating in response to a signal representative of the full opening of said by-pass valve,
    means for closing said exhaust valve and
    means for opening said guide vane to the limited opening as large as possible within the full opening of said by-pass valve;
  means for opening said main valve in response to a signal representative of the completion of said guide vane opening to said limited opening;
  means for detecting the increase in water pressure within said casing due to said opening of said main valve so as to open said guide vane from said limited opening to the full opening,
    said guide vane opening being controlled in response to the variation in water pressure within said casing due to the continuous main valve opening step so as to follow said main valve opening step,
    said guide vane opening being accomplished prior to said main valve being fully opened; and
  means for connecting in response to a signal representative of limiting, opening and disengagement of said guide vane said generators in parallel with a transmission system.

* * * * *